2,898,332
Patented Aug. 4, 1959

2,898,332

BIGUANIDE AZO DYES

Robert S. Long, Bound Brook, and Sien Moo Tsang, Middlesex, N.J., assignors to American Cyanamid Company, New York, N.Y., a corporation of Maine No Drawing. Application November 21, 1957
Serial No. 697,765

9 Claims. (Cl. 260—148)

The present invention refers to a new series of dyestuffs of the formula:

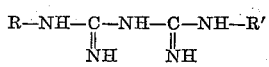

in which R and R' represent radicals of azo dyes, which radicals are not necessarily identical. These new dyestuffs, which lend themselves to excellent all-round application, possess good fastness characteristics and cover a wide range of attractive shades.

These products can be prepared via the reaction of dicyanamide with aromatic amines, as follows:

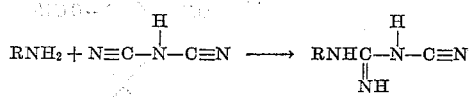

The intermediate substituted cyanoguanidine can then be reacted with a second mol of the same or a different amine, as follows:

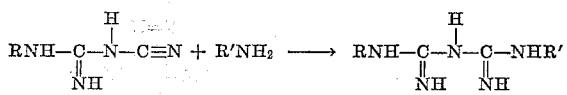

It has been discovered that these reactions succeed not only with simple amines, such as m-aminophenol, but also proceed smoothly with aminosulfonic acids such as J-acid and with certain azo dyes containing free amino groups. Furthermore, the products thus obtained are capable of diazotization and coupling reactions, depending upon the substituents present, and thus can give rise to a great variety of novel azo dyes, characterized by the presence of the biguanide linkage,

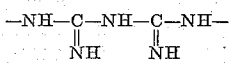

as a bridge between similar or dissimilar moieties of the molecule. This linkage is very stable and is not affected by the ordinary procedures of preparing and applying azo dyes. For example, if hydroxyl groups are present in positions ortho to the azo linkages, the dyes may be converted by ordinary methods to metallic complexes either on the fiber or in bulk. On the other hand, the use of proper hydrolytic conditions may lead to the corresponding guanylureas or biurets,

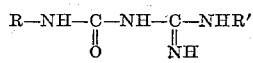

and

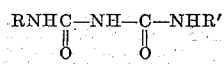

The varied components which can be incorporated into the novel dyes of the present invention give rise to a wide variety of shades and other properties, which can be altered according to the purpose in view. Thus, it is possible to obtain either azo pigments, which may also be of use for the dyeing of acetate or other synthetic fibers, or water-soluble azo dyes, which may be useful for the dyeing of wool, silk, cotton, nylon, etc. Because the biguanide nucleus is basic in character, even the unsulfonated azo pigments may be applied as basic dyes.

Probably the largest and most valuable single group are the direct dyes for cotton. An especially valuable series are derived from J-acid and have the formula:

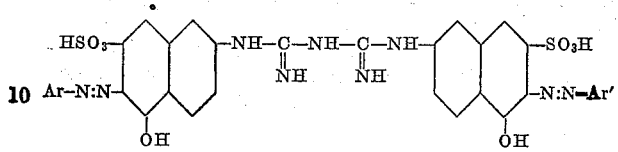

in which Ar and Ar' are aromatic radicals.

Probably the most useful method of preparation for compounds of this type is that in which J-acid is first reacted with dicyanamide to give 1,5-bis(5-hydroxy-7-sulfo-2-naphthyl)biguanide. This intermediate can then be reacted with a wide variety of diazotized aromatic amines to give the desired bis-azo and polyazo dyes. By carrying out the coupling in a step-wise manner and using two different diazo components, unsymmetrical dyes can be readily obtained.

Alternatively, one mol of J-acid can be reacted with one mol of dicyanamide to give N-(5-hydroxy-7-sulfo-2-naphthyl)-N'-cyanoguanidine. This intermediate can be coupled with one mol of a diazo component and then reacted with one mol of J-acid to give the biguanide which can be further coupled with any desired diazonium salt. In this way, the preparation of pure unsymmetrical azo dyes is facilitated. This ease of preparation of pure unsymmetrical azo compounds is in marked contrast to the corresponding urea dyes. The only practical method of preparation of the urea dyes is by reaction of phosgene with a mixture of aminoazo compounds and, even under carefully controlled conditions, this leads to a mixture of products.

If a symmetrical dye is desired, a useful alternative is to couple the diazonium salt first with an aminonaphthol such as J-acid and then to react two mols of this dye with one mol of dicyanamide.

Obviously, other aminohydroxy compounds may be used. Examples of such are 1-amino-7-naphthol, 1-amino-8-naphthol, 2-amino-6-naphthol, ortho-, meta-, and para-aminophenols, 1-amino-8-hydroxynaphthalene-3,6-disulfonic acid, 2-amino-8-hydroxynaphthalene-6-sulfonic acid, 2-amino-3-hydroxynaphthalene-6-sulfonic acid, 1-amino-8-hydroxynaphthalene-4-sulfonic acid, 2-amino-7-hydroxynaphthalene-3-sulfonic acid, 1-amino-8-hydroxynaphthalene-4,6-disulfonic acid, 1-amino-5-hydroxynaphthalene-7-sulfonic acid, and 2-amino-8-hydroxynaphthalene-3,6-disulfonic acid.

Examples of useful diazo compounds are those derived from aniline and substituted anilines, alpha- and beta-naphthylamine and derivatives, aminoazobenzene, aminoazobenzene sulfonic acid, as well as more complicated aminoazo compounds, such as H-acid coupled to cresidine. Of particular use are diazo components containing metallizable groups ortho to the diazo group, since when these are used with biguanide derivatives which couple ortho to an hydroxyl group, metallizable dyes are obtained. Examples of such diazo components are 2-aminoanisole-4-sulfonic acid, 2-aminophenol-4-sulfonic acid, 2-amino-4-chlorophenol, 2-amino-4-chlorophenol-6-sulfonic acid, 2-amino-4-nitrophenol, 2-amino-4-nitrophenol-6-sulfonic acid, anthranilic acid, 1-amino-2-naphthol-4-sulfonic acid, etc.

The metals usually used to form the metallized dyes are those of atomic numbers 24–30, namely chromium, manganese, iron, cobalt, nickel, copper and zinc. These are usually used in the form of their salts. Other polyvalent metals such as those of the various transition series in the periodic table (atomic numbers 42–47, 58–71, and 74–80), as well as aluminum, lead, zirconium, and the like similarly can be used.

In general, any diazotizable amine can be used (in the form of its diazo) to couple with the hydroxy aryl biguanides to form the new dyes of our invention. The more important ones are to be found described in "The Chemistry of Synthetic Dyes" by Venkataraman, Academic Press, New York, 1952, in the various chapters on azo dyes and intermediates, such as chapters 3–6 inclusive, 8–22 inclusive.

These methods of preparation, all based on dicyanamide, are considered the most desirable, but the invention is not limited in any way by preparative methods. A number of methods are known for the preparation of N-arylcyanoguanidines, the intermediates obtained in the above syntheses. For example, cyanogen chloride may be reacted with guanidine, or a derivative of guanidine; however, cyanogen chloride is toxic and difficult to handle, and the preparation of a suitable guanidine by this method involves additional problems.

This application is a continuation-in-part of our copending application, Serial No. 462,373, filed October 14, 1954, now abandoned, which is a division of our copending application, Serial No. 358,574, filed May 29, 1953, now abandoned.

The present invention is further described in the following examples. Parts are by weight, unless otherwise specified.

*Example 1*

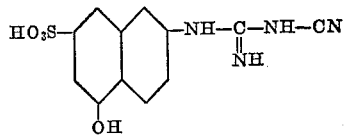

A mixture of 48 parts (pure basis) of J-acid and 22.3 parts of sodium dicyanamide in 1000 parts of water is heated for several hours at 90–95° C. while 5 N hydrochloric acid is added as needed to maintain the pH at about 4.5. The reaction mixture is then neutralized to a pH of 7 and the product isolated by evaporation to dryness.

*Example 2*

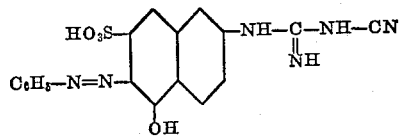

The diazo is prepared in the ordinary way from 9.6 parts of aniline and gradually added to a solution of 32.8 parts of the product of the preceding example and 53.0 parts of sodium carbonate in 250 parts of water. The mixture is then finally allowed to stir overnight and filtered. The product is washed with brine and dried.

*Example 3*

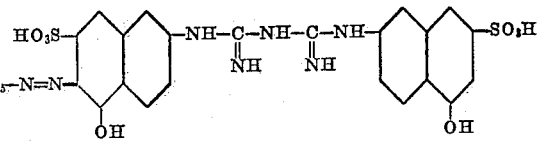

A mixture of 34.6 parts of the product of the preceding example and 28.5 parts (pure basis) of J-acid with 250 parts of water is heated at 100° C., acidified to a pH of approximately 4 with 5 N hydrochloric acid and heated for 24 hours. It is then cooled and filtered. The product is washed with salt solution and purified by dissolving in alkali and reprecipitating. It readily couples with diazo compounds in the free position ortho to the hydroxyl group.

*Example 4*

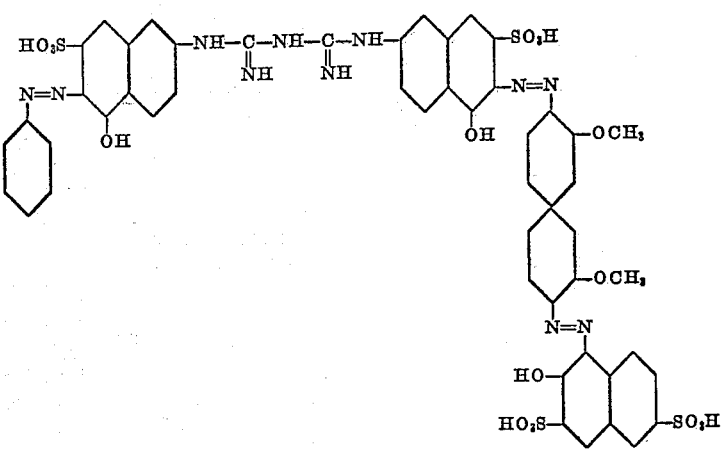

Dianisidine tetrazo is prepared from 1.22 parts of dianisidine in the ordinary way. The tetrazo solution is neutralized with sodium bicarbonate. To this treated solution, a solution of 1.78 parts of R-salt and 0.27 part of sodium carbonate in 51 parts of water is added slowly in one hour. The resulting slurry is treated with 18 parts of pyridine and then a solution of 3.54 parts of the product of the preceding example, and 0.2 part of sodium hydroxide and 20 parts of water. The mixture is finally allowed to stir overnight, and heated to 50° C. for a few hours and filtered. The product is washed with brine and dried. The product dyes cotton reddish-blue.

*Example 5*

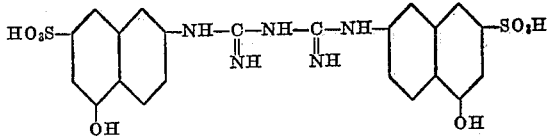

A mixture of 243.9 parts of J-acid (40.2% paste), 17.8 parts of sodium dicyanamide, and 200 parts of water is refluxed for 22 hours, the pH being approximately 4.6. The resulting solution is made slightly alkaline with sodium carbonate, and salted with 120 parts of sodium chloride. The mixture is cooled thoroughly and filtered, the product being washed with salt solution followed by alcohol.

Example 6

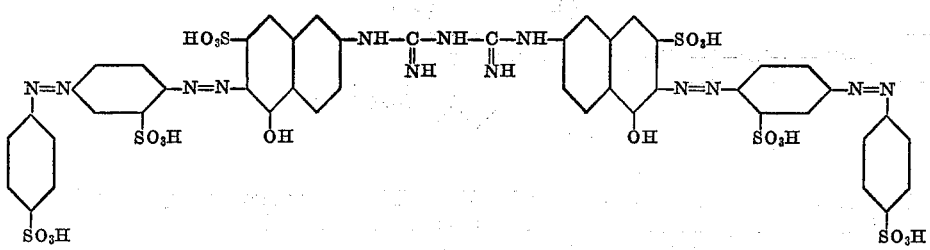

A solution of 8.6 parts of 4-aminoazobenzene-3,4'-disulfonic acid in 100 parts of water is iced to 15° C. and diazotized in the ordinary way with hydrochloric acid and sodium nitrite. The resulting diazo is added to a solution of 5.86 parts of the bis-J-acid biguanide of Example 5 in 200 parts of water. There is finally added a solution of 8.4 parts of sodium bicarbonate in 150 parts of water. The reaction mixture is then stirred overnight, and treated with 35 parts of sodium hydroxide and 240 parts of sodium chloride. The product is filtered and washed thoroughly with alkaline salt solution. It may be purified by reprecipitation from aqueous solution with alkali and salt. The product is a direct brilliant red dye.

Example 7

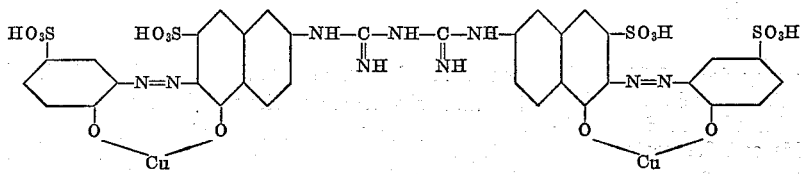

The diazo prepared in the ordinary way from 4.47 parts of 2-aminoanisole-4-sulfonic acid is added at 5–10° C. to a solution of 5.86 parts of the bis-J-acid biguanide of Example 5 and 10.6 parts of sodium carbonate in 200 parts of water. The resulting mixture is stirred overnight and filtered. The product is washed with salt solution and dried. It is then copperized in the ordinary way with ammoniacal copper sulfate solution. It gives reddish-purple dyeings having excellent light fastness.

Example 8

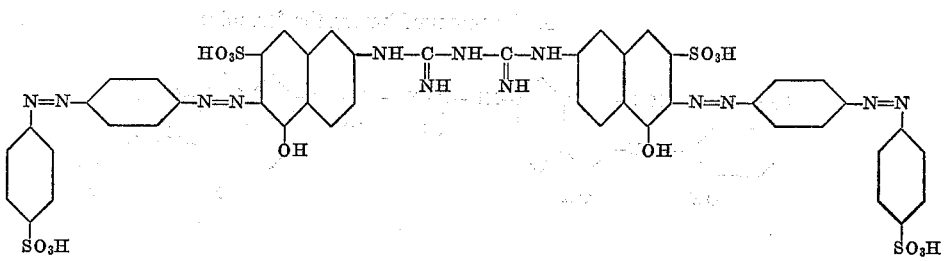

The diazo is prepared in the ordinary way from 5.82 parts (pure basis) of 4-aminoazobenzene-4'-sulfonic acid with hydrochloric acid and sodium nitrite. This is then added to a solution of 5.86 parts of the bis-J-acid biguanide of Example 5 and 8.4 parts of sodium bicarbonate in 200 parts of water. The mixture is stirred overnight, salted with 70 parts of sodium chloride, and filtered. The product may be purified by resalting. It gives direct bluish-red dyeings on cotton.

Example 9

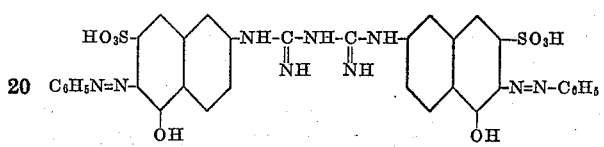

The diazo is prepared in the ordinary way from 1.86 parts of aniline with dilute hydrochloric acid and sodium nitrite solution. This is added to a solution of 5.89 parts of bis-J-acid biguanide of Example 5 in dilute aqueous sodium carbonate. The mixture is stirred overnight, and the scarlet precipitate filtered and dried at 75° C. It dyes cotton cloth yellowish-scarlet shades.

Example 10

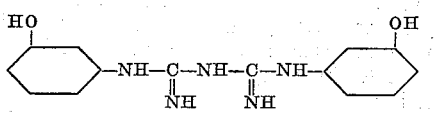

A mixture of 48.0 parts of m-aminophenol, 17.8 parts of sodium dicyanamide, and 200 parts of water is heated rapidly to 90° C., followed by the gradual addition of 92 parts of 5 N hydrochloric acid. The mixture is then refluxed for several hours, treated with 28 parts of anhydrous sodium sulfate, and allowed to stand overnight. The dark lower layer is removed, dissolved in dilute hydrochloric acid, and reprecipitated with sulfuric acid. The product, in the form of the acid sulfate, is filtered, washed, and dried. A good yield is obtained. It may be purified by dissolving in sodium hydroxide solution and precipitating with sulfuric acid. It melts with decomposition at approximately 227° C.

Example 11

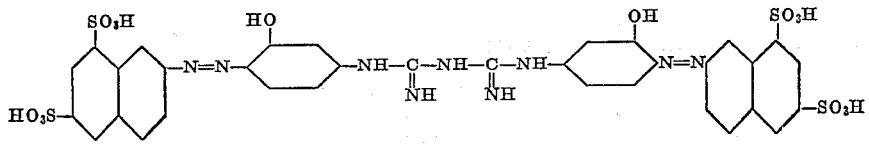

A solution is prepared from 3.83 parts of the bis-(m-hydroxyphenyl)biguanide of the preceding example with 100 parts of water and just enough sodium hydroxide to effect solution. To this is added 47 parts of 10% sodium carbonate solution followed by cooling to 20° C. There is then slowly added the diazo solution prepared in the usual way from 6.05 parts (pure basis) of amino G-acid, 100 parts of water, 13 parts of 5 N hydrochloric acid, and approximately 20 parts of N/1-sodium nitrite solution. The reaction mixture is stirred overnight, salted with 35 parts of sodium chloride, and filtered. The product is dried at 75° C. It is a yellow dye. It is probable that other isomers are present in addition to the one represented by the above formula.

Example 12

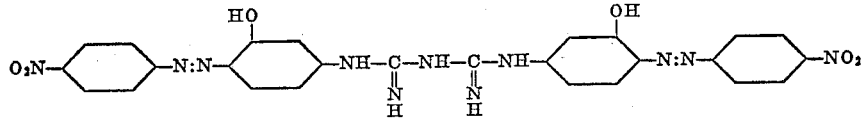

The diazo prepared in the ordinary way from 2.76 parts of p-nitroaniline is added at 15° C. to a solution of 3.83 parts of bis-(m-hydroxyphenyl)biguanide of Example 10, 0.16 part of sodium hydroxide and 8.2 parts of sodium acetate in 100 parts of water. The resulting mixture is stirred overnight and then filtered. The product is washed with water and dried. It is slightly soluble in water in the presence of acetic acid or hydrochloric acid. It dyes some synthetic fibers such as acetate rayon and polyacrylonitrile fiber yellow. It is probable that other isomers are present in addition to the one represented by the above formula.

We claim:

1. Compounds selected from the group consisting of (a) azo dyes obtained by coupling diazonium salts with compounds having the formula:

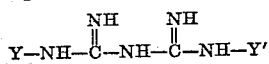

in which Y and Y' are aromatic carbocyclic radicals of less than three six-membered rings, at least one of Y and Y' being substituted by a hydroxyl group, there being in the said hydroxy substituted radical on the same ring as the hydroxyl group an unsubstituted position capable of coupling and (b) metal complexes of the azo dyes of (a) derived from a polyvalent metal selected from the group consisting of metals of atomic number 24–30 inclusive, 42–47 inclusive, 58–71 inclusive, 74–80 inclusive, aluminum, lead and zirconium.

2. Azo dyes obtained by coupling diazonium salts with compounds having the formula:

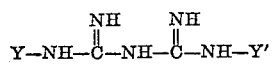

in which Y and Y' are aromatic carbocyclic radicals of less than three six-membered rings, at least one of Y and Y' being substituted by a hydroxyl group, there being in the said hydroxy substituted radical on the same ring as the hydroxyl group an unsubstituted position capable of coupling.

3. Azo dyes of claim 2 in which the said hydroxyl group is adjacent to the position of coupling.

4. Polyvalent metal complexes of the dyes of claim 3 in which the metal is selected from the group consisting of metals of atomic numbers 24–30 inclusive, 42–47 inclusive, 58–71 inclusive, 74–80 inclusive, aluminum, lead and zirconium.

5. A compound having the formula:

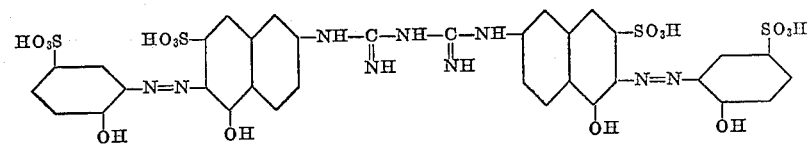

6. A compound having the formula:

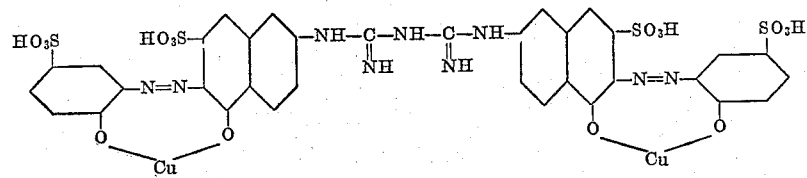

7. A compound having the formula:
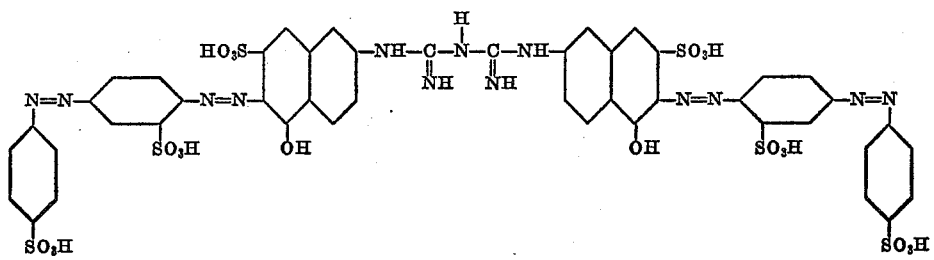
8. A compound having the formula:
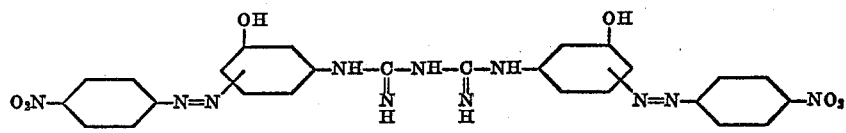
9. A compound having the formula:
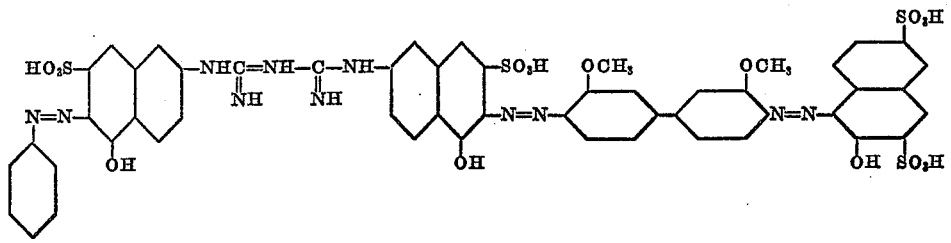
References Cited in the file of this patent
UNITED STATES PATENTS
| | | |
|---|---|---|
| 1,509,442 | Penny | Sept. 23, 1924 |
| 2,369,307 | McClellan | Feb. 13, 1945 |
| 2,455,896 | Nagy | Dec. 7, 1948 |
| 2,455,897 | Nagy | Dec. 7, 1948 |